United States Patent [19]

Wagensonner et al.

[11] 3,812,504
[45] May 21, 1974

[54] INDICATOR ARRANGEMENT FOR A PHOTOGRAPHIC CAMERA

[75] Inventors: Eduard Wagensonner, Aschheim; Kurt Borowski; Friedrich Stumpf, both of Munich, all of Germany

[73] Assignee: AGFA-Gevaert Aktiengesellschaft, Leverkusen, Germany

[22] Filed: Apr. 12, 1973

[21] Appl. No.: 350,467

[30] Foreign Application Priority Data
Apr. 18, 1972 Germany............................ 2218704

[52] U.S. Cl. ............... 95/10 CE, 340/221, 356/227
[51] Int. Cl. ................................................ G01j 1/44
[58] Field of Search ........... 95/10 C, 10 CE, 10 CT; 356/227, 226; 352/141; 340/221

[56] References Cited
UNITED STATES PATENTS
3,436,158   4/1969   Schmitt.............................. 356/226
3,661,062   5/1972   Wisst................................ 95/10 CE
3,220,326   11/1965   Scudder........................... 95/10 CE

OTHER PUBLICATIONS

Frederick F. Morehead, Jr., "Light–Emitting Semiconductors," Scientific American, May 1967, p. 109.

*Primary Examiner*—Joseph F. Peters, Jr.
*Attorney, Agent, or Firm*—Michael S. Striker

[57] ABSTRACT

The battery of the camera has a voltage divider including a photoelectric transducer connected in parallel with it. The voltage divider tap is connected to the base of a transistor whose collector-emitter circuit is connected to a luminescent diode through a series resistor. The transistor is highly conductive when insufficient light for an exposure falls on the photoelectric transducer. Further, a variable resistor in parallel with the luminescent diode is adjusted so that the voltage drop across the luminescent diode is less than its threshold voltage for a battery voltage less than a predetermined minimum battery voltage when light is blocked from the photoelectric transducer.

5 Claims, 2 Drawing Figures

3,812,504

INDICATOR ARRANGEMENT FOR A PHOTOGRAPHIC CAMERA

BACKGROUND OF THE INVENTION

The present invention relates to arrangements for indicating insufficient light for an exposure and for furnishing a battery control signal in a photographic camera.

SUMMARY OF THE INVENTION

It is an object of the present invention to furnish an indicator arrangement which does not operate with moving contacts and which does not require much power. Further, the arrangement must be able not only to furnish an indication when the light available for an exposure is less than a predetermined light quantity, but also must be able to indicate when the battery voltage exceeds or is less than a predetermined battery voltage.

The present invention resides in a camera having a battery for furnishing a battery voltage. It is an arrangement for furnishing a visual indication when the light available for an exposure is less than a predetermined light quantity and when said battery voltage is greater than a predetermined minimum battery voltage. The present invention comprises luminescent light source means connected to said battery for emitting light when the voltage across said luminescent light source means exceeds a predetermined threshold voltage. It comprises transistor means having an emitter-collector circuit connected to said luminescent light source means, siid transistor means further having a base. A voltage divider means is connected to said battery and has a voltage divider tap connected to said base of said transistor means. The voltage divider means comprises light-sensitive transducer means connected to said base of said transistor means in such a manner that said emitter-collector circuit is highly conductive when said light available for an exposure is less than said predetermined light quantity. Further, the invention comprises resistance means connected to said luminescent light source means and said emitter-collector circuit of said transistor means in such a manner that the voltage across said luminescent light source means exceeds said predetermined threshold voltage when no light falls on said light-sensitive transducer means and said battery voltage exceeds said predetermined battery voltage. The voltage across said luminescent light source means is less than said predetermined threshold voltage when no light falls on said light-sensitive transducer means and said battery voltage is less than said predetermined minimum battery voltage.

In operation, when the light falling on the light-sensitive transducer means is too little to carry out a hand-held exposure, the emitter-collector circuit of said transistor means becomes highly conductive, the voltage across said luminescent light source means exceeds said predetermined threshold voltage and said luminescent light source means emits light, indicating to the user that either a tripod must be used or an electronic flash unit.

If the photographer then desires to test the battery, light must be blocked from the light-sensitive transducer means. The signal at the base of the transistor means is then such that the emitter-collector circuit becomes highly conductive. If the battery voltage now exceeds a predetermined minimum battery voltage, the luminescent light source means will emit light. If, however, the battery voltage is less than said predetermined minimum battery voltage the luminescent light source means will either emit no light whatsoever or will emit only an extremely weak light, since the voltage across it will be less than the predetermined threshold voltage. This weak light or the complete absence of light will indicate to the photographer that the battery must be replaced.

In a preferred embodiment of the present invention, blocking means such as a slider are mounted into the camera in order to block light from the light-sensitive transducer means when the battery test is to be carried out.

In a preferred embodiment of the present invention, the resistance means comprise a variable resistor connected in parallel with the luminescent light source means, thereby forming a parallel circuit. Further, the resistance means comprise a resistor connected in series with said parallel circuit and also connected in series with said emitter-collector circuit of said transistor means.

If the camera, in addition to the above-described indicator arrangement also has an exposure control circuit which responds to light falling on light-sensitive transducer means, the use of a differential light-sensitive transducer means, such as a differential photoresistor, can avoid the use of contacts. One half of the differential photoresistor would be connected to the exposure control circuit, while the other half would be permanently connected to the indicator arrangement of the present invention.

The novel features which are considered characteristic for the invention are set forth in particular in the appended claims. The invention itself, however, both as to its construction and method of operation, together with additional objects and advantages thereof, will best be understood from the following description of specific embodiments when read in conjunction with the accompanying drawing.

DESCRIPTION OF THE PREFERRED EMBODIMENT

Figure 1:
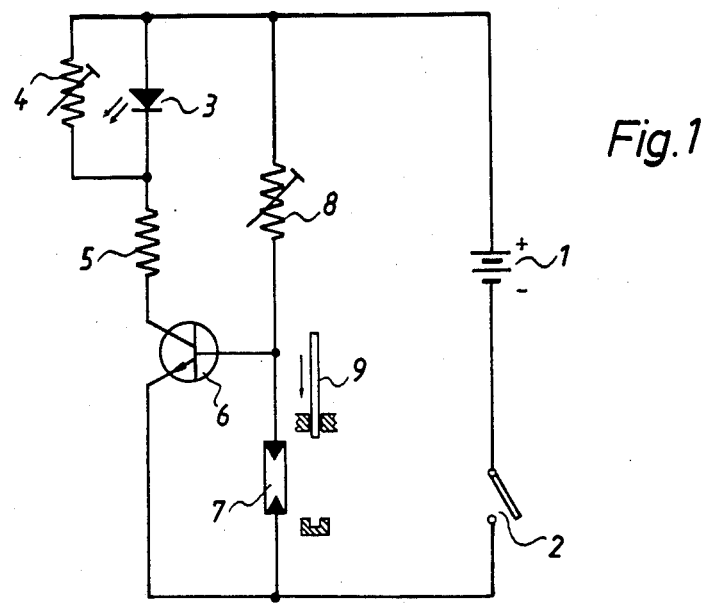
FIG. 1 is a circuit diagram showing a first embodiment of the present invention.

A preferred embodiment of the invention will now be described with reference to the drawing.

In FIG. 1 reference numeral 1 refers to a battery which may be connected to the indicator arrangement by means of a switch 2. The indicator arrangement comprises luminescent light source means, here a luminescent diode 3. Connected in parallel with luminescent diode 3 is a variable resistor 4. Connected in series with the thus-formed parallel combination is a fixed resistor 5 whose other terminal is connected to the emitter-collector circuit of a transistor 6. The base of transistor 6 is connected to voltage divider means comprising a resistor 8 connected from the positive side of the battery to the voltage divider tap, and light-sensitive transducer means, here a photoresistor 9 connected from the voltage divider tap to the negative side of the battery when switch 2 is closed. Resistor 8 is an adjustable resistor. The adjustment of resistor 8 is made in such a way that, for a particular illumination of photoresistor 7, at which a hand-held exposure can just barely be made, transistor 6 is conductive to such an extent that the voltage across the luminescent diode 3 definitely exceeds its predetermined threshold voltage. The resistance of resistor 4 is so adjusted that when no light falls on photoresistor 7, the voltage across the luminescent diode 3 exceeds a predetermined threshold voltage only when the battery voltage exceeds a predetermined minimum battery voltage. Thus, it is so adjusted that when the battery voltage exceeds the predetermined minimum battery voltage the voltage drop across luminescent diode 3 exceeds its threshold voltage and the luminescent diode glows. When the battery voltage is less than the predetermined battery voltage, the voltage across luminescent diode 3 is less than the predetermined threshold voltage and no light is emitted by said diode. Thus, when the photographer covers the photoresistor 7, a weak glow of diode 3 indicates that the battery voltage is at or barely exceeds the predetermined minimum battery voltage, while a complete absence of light from luminescent diode 3 tells the photographer that the battery voltage is definitely below the predetermined minimum battery voltage.

Figure 2:
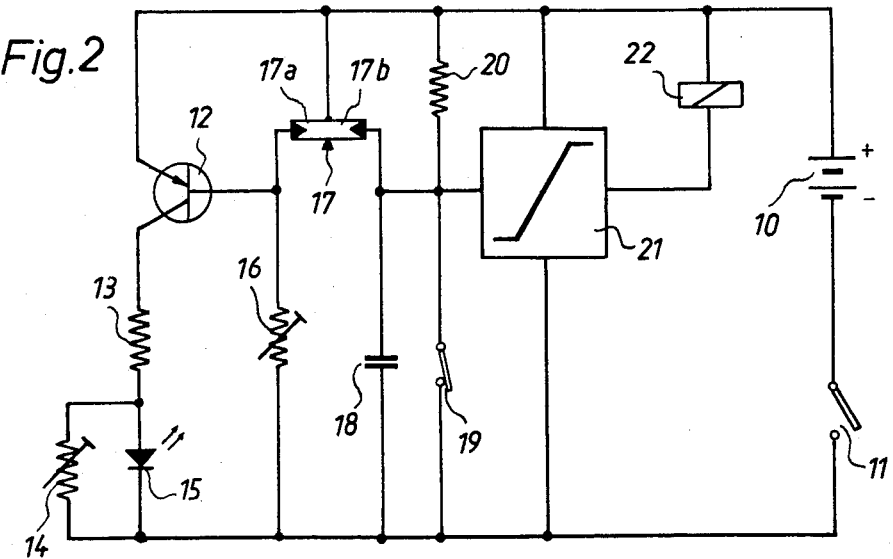
FIG. 2 shows a second embodiment of the present invention wherein the camera has an automatic exposure control circuit.

In the embodiment shown in FIG. 2, a battery 10 serves as a source of energy not only for an indicator arrangement such as shown in FIG. 1, but also for an automatic exposure control arrangement. The indicator arrangement has a transistor 12 whose emitter-collector circuit is connected in series with a fixed resistor 13, the other terminal of fixed resistor 13 being connected to the parallel combination of the luminescent diode 15 and an adjustable resistor 14. The base of transistor 12 is connected to one half, 17a, of a differential photoresistor 17 and is connected to the negative side of a battery through an adjustable resistor 16. Thus one half of the photoresistor 17a, forms a voltage divider in conjunction with the adjustable resistor 16. The second half of the photoresistor, labelled 17b in the Figure, is connected in series with a capacitor 18. The capacitor 18 may be short-circuited by the closing of a switch 19, thereby disabling the automatic exposure control arrangement. Connected in series with the switch 19, and in parallel with photoresistor 17b, is a fixed resistor 20. The common point of fixed resistor 20 and switch 19 connected to the input of a 19 is stage 21 whose output controls a relay coil 22.

The indicator arrangement operates exactly like that shown in FIG. 1. The exposure control circuit, when switch 19 is open, operates as a standard exposure control circuit, that is when the voltage across the capacitor 18 exceeds the predetermined voltage, bistable stage 21 switches from a first to a second stage, thereby changing the state of energization of relay 22. When relay 22 is in the state corresponding to the second state of the bistable stage 21, the shutter is closed terminating the exposure. The main thing to be noticed about FIG. 2 is the use of the differential photoresistor 17, one half of which is permanently connected to the indicator circuit, while the other half is permanently connected to the exposure control circuit. The use of a switch having contacts is thus avoided.

While the invention has been illustrated and described as embodied in a circuit using a particular luminescent light source and a particular type of light-sensitive transducer means, it is not intended to be limited to the details shown, since various modifications and structural and circuit changes may be made without departing in any way from the concept of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations and modifications should and are intended to be comprehended within the meaning and range of equivalence of the following claims.

What is claimed as new and desired to be protected by Letters Patent is set forth in the appended claims:

1. In a camera having a battery for furnishing a battery voltage, an arrangement for furnishing a visual indication when the light available for an exposure is less than a predetermined light quantity and when said battery voltage exceeds a predetermined minimum battery voltage, comprising, in combination, light source means connected to said battery for emitting light when the voltage across said light source means exceeds a predetermined threshold voltage; transistor means having an emitter-collector circuit connected to said light source means, and a base; voltage divider means connected to said battery and having a voltage divider tap connected to said base of said transistor means, said voltage divider means having light-sensitive transducer means connected to said base of said transistor means in such a manner that said emitter-collector circuit is conductive when said light available for an exposure is less than said predetermined light quantity; and resistance means connected to said emitter-collector circuit and to said light source means in such a manner that said voltage across said light source means exceeds said predetermined threshold voltage when no light falls on said light-sensitive transducer means and said battery voltage exceeds said predetermined minimum battery voltage, and is less than said threshold voltage when no light falls on said light-sensitive transducer means and said battery voltage is less than said predetermined minimum battery voltage.

2. An arrangement as set forth in claim 1, further comprising blocking means for blocking light from said light-sensitive transducer means upon external activation.

3. An arrangement as set forth in claim 1, wherein said resistance means comprise a variable resistor connected in parallel with said light source means, thereby forming a parallel circuit, and a fixed resistor connected in series with said parallel circuit.

4. An arrangement as set forth in claim 1, wherein said light source means is a luminescent diode.

5. An arrangement as set forth in claim 1, further comprising exposure control means connected to said indicator arrangement; and wherein said light-sensitive transducer means comprise a differential light-sensitive transducer having a first half connected to said indicator arrangement and a second half connected to said exposure control means.

* * * * *